United States Patent
Bahng

(10) Patent No.: US 7,414,643 B2
(45) Date of Patent: Aug. 19, 2008

(54) METHOD FOR COMPENSATING FOR POSITION ERROR IN AN OPTICAL DISC APPARATUS

(75) Inventor: Keuk Young Bahng, Osan-si (KR)

(73) Assignee: Hitachi-LG Data Storage Korea, Inc, Seoul (KR)

( * ) Notice: Subject to any disclaimer, the term of this patent is extended or adjusted under 35 U.S.C. 154(b) by 255 days.

(21) Appl. No.: 11/410,290

(22) Filed: Apr. 25, 2006

(65) Prior Publication Data

US 2006/0256677 A1   Nov. 16, 2006

(30) Foreign Application Priority Data

Apr. 26, 2005   (KR)   ........................ 10-2005-0034343

(51) Int. Cl.
G11B 19/12 (2006.01)
G11B 19/14 (2006.01)
G11B 23/42 (2006.01)
B41J 2/435 (2006.01)

(52) U.S. Cl. .................. 347/224; 369/47.1; 369/47.38; 369/47.4

(58) Field of Classification Search .................. 347/224; 369/47.1, 47.36, 47.38, 47.4
See application file for complete search history.

(56) References Cited

U.S. PATENT DOCUMENTS

| 4,982,297 A * | 1/1991 | Tsujisawa ................ 360/77.04 |
|---|---|---|
| 6,975,566 B2 * | 12/2005 | Park ......................... 369/44.28 |
| 2005/0058044 A1 | 3/2005 | Koegler, III et al. |
| 2005/0265145 A1 * | 12/2005 | Nakane et al. ........... 369/44.27 |
| 2006/0215523 A1 * | 9/2006 | Park ......................... 369/53.45 |
| 2006/0227680 A1 * | 10/2006 | Bahng ....................... 369/47.1 |

FOREIGN PATENT DOCUMENTS

| EP | 1 515 318 | 3/2005 |
|---|---|---|
| EP | 1 439 537 | 7/2007 |

OTHER PUBLICATIONS

European Search Report dated Dec. 4, 2006.

* cited by examiner

*Primary Examiner*—Huan H Tran
(74) *Attorney, Agent, or Firm*—Ked & Associates, LLP

(57) ABSTRACT

A method for compensating for a position error in an optical disc drive (ODD) is provided. The method compensates for a position error generated by a step error associated with a motor which moves an optical pickup unit across a surface of an optical disc. Error data associated with each step of the motor is stored in a memory unit of the ODD, and compensation for the related position error is accomplished by compensating for a track-direction movement of an actuator. The method is particularly useful when conducting a label-printing operation, in that it allows the label printing operation to be performed without generating position errors, gaps, or overwrites on a label surface of the disc, thus enhancing the quality of a label-printing operation and the resulting label.

18 Claims, 11 Drawing Sheets

FIG. 1
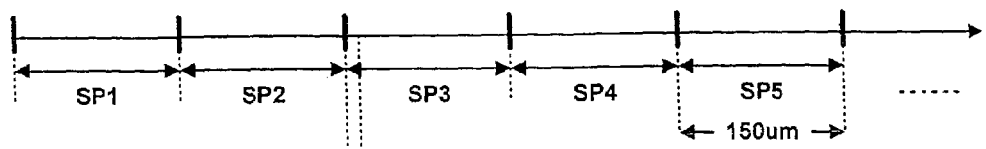
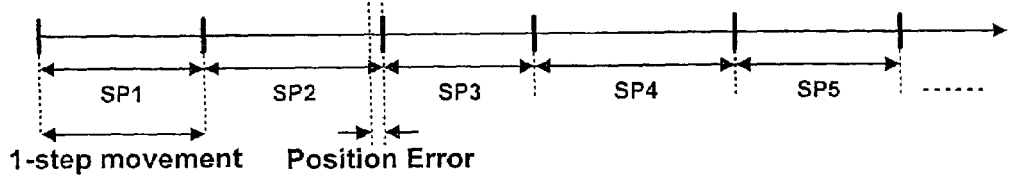
FIG. 2
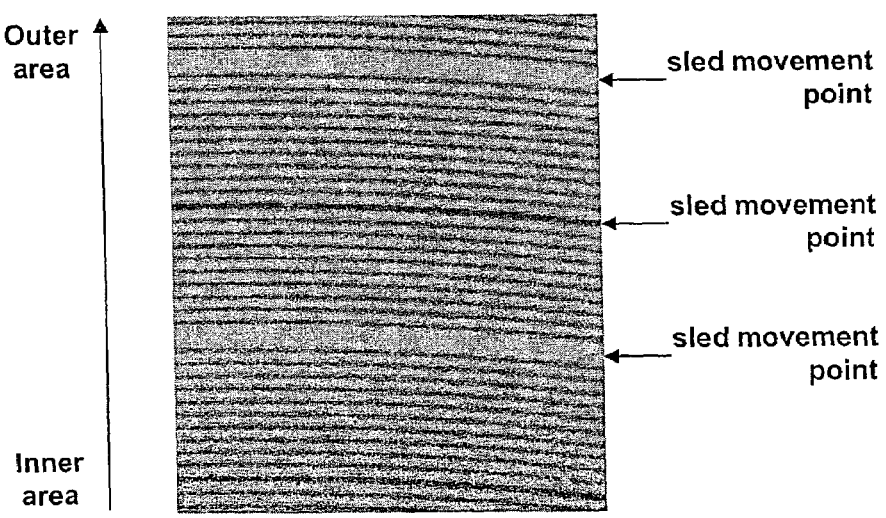

METHOD FOR COMPENSATING FOR POSITION ERROR IN AN OPTICAL DISC APPARATUS

BACKGROUND OF THE INVENTION

1. Field of the Invention

The invention relates to a method for compensating for a position error in an optical disc apparatus, and, more particularly, to a method for compensating for a position error generated when a label is printed on a label surface of an optical disc by an optical disc apparatus.

2. Background of the Related Art

Optical discs have been developed recently which allow data to be recorded on a data surface of the disc, and a label with a desired design to be printed on the opposite, or non-data surface of the disc. The surface of the disc on which a label is printed is referred to as the label surface of the disc. Labels are typically transferred onto the label surface of the disc using a laser etching technology commonly referred to as LightScribe, in which a laser burns or etches an image onto a specially prepared, non-data side of an optical disc. A LightScribe disc is referred to herein simply for ease of discussion. However, it is well understood by those of ordinary skill in the art that the invention may be applied to any such disc which includes a surface on which a label may be printed, and, more particularly, to any such disc which includes a data side and a non-data side which has been specially prepared for laser printing or etching.

A land/groove for performing a tracking servo operation during a data recording process is formed on the data surface of the optical disc, and Absolute Time In Pre-groove (ATIP) information for detecting a current position is recorded as a wobble land/groove. An optical disc recording apparatus receives a push-pull signal generated by the land/groove and performs a tracking servo operation using an established feedback scheme, recognizes a current position based on the ATIP information, and thus can perform a random access operation at a desired position.

However, such a wooble land/groove is formed only on the data surface of the disc, and not on the label surface of the disc. Thus, as the label surface lacks the ATIP information used to detect a current position, neither the tracking servo operation nor the random access operation can be performed on the label surface of the disc. Rather, labels must be sequentially printed on the label surface of the optical disc, starting at an inner area and progressing towards an outer area of the optical disc based on a feed-forward scheme. Thus, this type of disc is very sensitive to the dynamic characteristics of an actuator of the optical pickup unit associated with a tracking servo.

To address these problems, a saw-teeth zone is allocated to a Control Feature Outer Ring (CFOR) zone of this type of disc. The CFOR zone is provided on the label surface in the form of a circular band having a predetermined width of, for example, 650 µm. Other widths may also be appropriate. The saw-teeth zone is divided into two zones opposite each other in the CFOR zone in consideration of eccentricity of the optical disc. A first area having a high reflection factor engages with a second area having a low reflection factor in the form of a plurality of saw-teeth. As a laser beam is directed at the center of the CFOR zone and the disc rotates, a resulting duty ratio of a reflected signal should be 50%. However, if a predetermined voltage is applied to an actuator arranged in the direction of a track which causes an objective lens to be positioned off center of the CFOR zone, as the disc rotates a laser beam directed at the CFOR zone is also off center, and the resulting duty ratio of the reflected signal would not necessarily be equal to 50%.

Therefore, an optical recording apparatus capable of performing a label-printing operation on a label surface of a disc may measure an actual sensitivity the actuator as it moves the objective lens in a track direction based on the magnitude of a predetermined voltage to be applied to the actuator in order to shift an objective lens to the outer area of the disc by a predetermined distance, and then perform a tracking servo operation using a feed-forward scheme based on the measured actual sensitivity of the track-direction actuator. However, other critical components associated with this tracking servo operation which affect recording quality of the optical disc include the dynamic characteristics of a sled motor which moves the optical pickup unit in a radial direction of the disc. The sled motor includes a step motor and a device for converting a rotation of the step motor into rectilinear motion. This conversion often results in unexpected step errors generated by mechanical factors (such as, for example, angle errors in frame/yoke values, non-uniform assembly at an inner diameter of the frame/yoke values, and the like) and electrical factors (such as, for example, winding resistance, non-uniformity between inductance phases, and unbalanced magnetic flux formed on the surface of each tooth, and the like).

FIG. 1 shows an ideal sled movement distance and actual sled movement distance for each step of an exemplary step motor. Due to the above-mentioned factors, an unexpected position error may occur during the sled movement as shown in FIG. 1. The tracking error resulting from this position error is shown in FIG. 2. Therefore, although the optical recording apparatus capable of performing a label-printing operation may be able to compensate for dynamic characteristics of an actuator based on operation of the saw-teeth zone, it cannot compensate for any position error generated by the sled motor as the optical pickup unit moves from the inner portion towards an outer circumference of the disc. This position error may result in space on the label surface on which a portion of a label is not printed may, or a portion of a label may be printed twice, each resulting in deterioration of quality.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

In accordance with an aspect of the invention as embodied and broadly described herein, a method for compensating for a position error in an optical disc drive may include the step of compensating for a position error caused by a movement of an optical pickup unit, on the basis of error data, stored in the optical disc drive, for each step of a motor moving the optical pickup unit, when printing a label on a LightScribe disc.

Preferably, the error data for each step is stored in association with one rotation of the motor; and compensation of the position error is established by compensating for a track-direction movement of an actuator.

Preferably, the method includes previously storing position error data and corresponding step movement data during manufacturing of a recording device incorporating the optical pickup.

In accordance with an aspect of the invention as embodied and broadly described herein, a method of printing a label on recordable medium including a data surface configured to receive and store data on a first side thereof, and a label surface configured to receive a label printed thereon on a second side opposite the first side, may include reading a first pattern from the recordable medium to determine if the recordable medium includes both a data surface on a first side thereof and a label surface on a second side opposite the first side thereof, wherein the first pattern is read by a spoke detector and comprises a plurality of spokes provided proximate an inner circumference of a recordable medium, determining if a surface of the recordable medium facing an optical pickup device corresponds to the data surface or the label surface of the recordable medium based on a reflection of optical light from the surface of the recordable medium facing the optical pickup, synchronizing operation of the optical pickup device with a reference position delineated by the first pattern if it is determined that the surface of the recordable medium facing the optical pickup device is the label surface, accessing a plurality of predetermined position error compensation values corresponding to a plurality of predetermined step movements within a rotation of a step motor which moves the optical pickup device, and applying the plurality of predetermined position error compensation values to compensate for a position error as the step motor rotates and moves the optical pickup device while performing a label printing operation to print an image on the label surface of the recordable medium.

In accordance with an aspect of the invention as embodied and broadly described herein, a method of printing a LightScribe disc may include comprising determining whether a recordable medium is a LightScribe disc based on a first pattern corresponding to spokes provided near an inner circumference of the recordable medium using a spoke detector; determining whether a surface facing an optical pickup device corresponds to a data surface or a label surface based on whether reflection of optical light occurs on the surface or within the LightScribe disc; detecting a second pattern corresponding to an index mark; synchronizing with a spoke corresponding to position "0", the spokes providing location information of index mark, saw teeth area, media ID area, and controlling a speed of rotation of the LightScribe disc; detecting media ID on the LightScribe disc; and printing on the label surface of the LightScribe disc, comprising compensating for a position error for each step/sled movement of a prescribed distance of an optical pickup device, wherein a 360 degree rotation corresponds to 20 step/sled movements of the optical pickup device such that each step/sled movement corresponds to an 18 degree rotation of a step motor and the prescribed distance corresponds to 150 µm of the step motor, wherein any position error for each step movement deviating from 150 µm is previously stored in a memory for compensating for any position error during the print step.

The method of claim 1, further comprising previously storing position error data and corresponding step movement data during manufacturing of a recording device incorporating the optical pickup.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 provides a comparison between ideal and actual sled movement distances for sequential steps of an exemplary step motor;

FIG. 2 provides an example of tracking error generated by a position error;

FIG. 12 is a graph illustrating error compensation values of individual steps of a step motor such as the exemplary step motor shown in FIG. 10, in accordance with an embodiment of the.

DETAILED DESCRIPTION OF PREFERRED EMBODIMENTS

Figure 3:
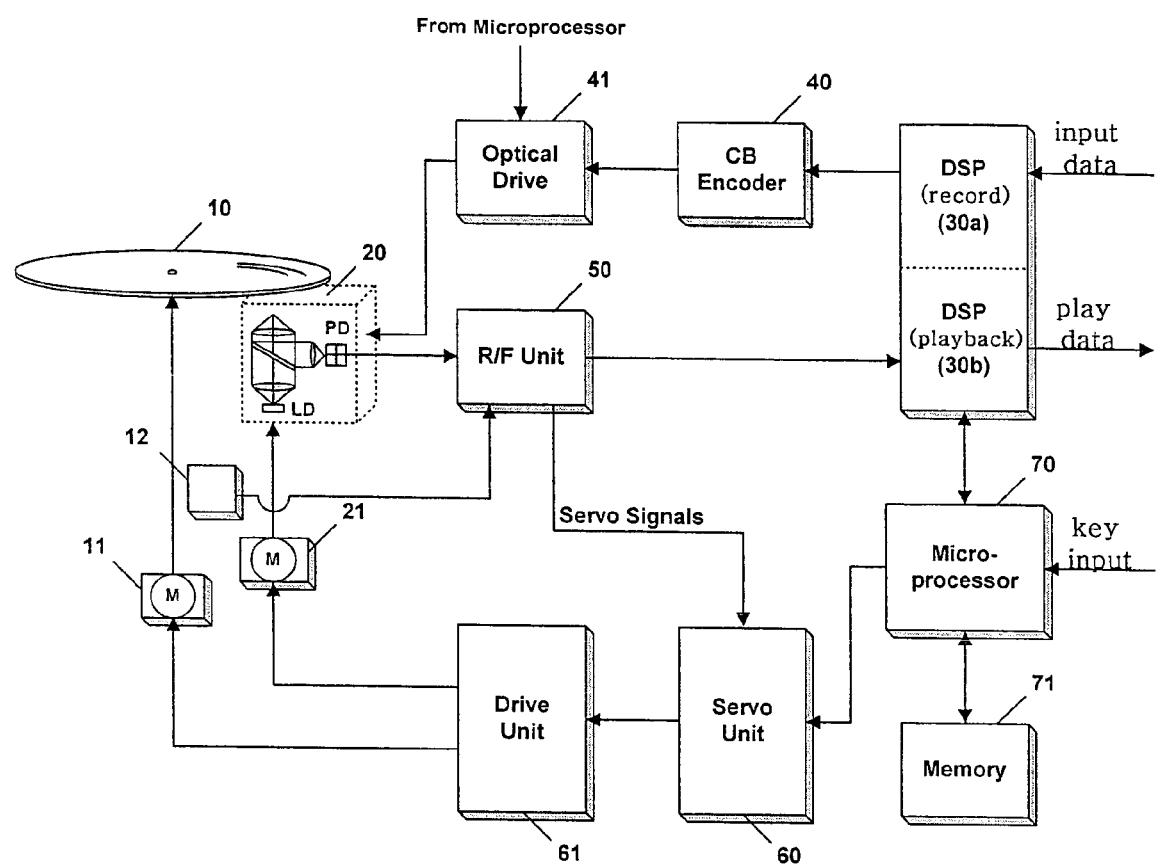
FIG. 3 is a schematic view of an exemplary optical disc drive (ODD) in which a position error compensation method in accordance with an embodiment of the invention may be implemented.

FIG. 3 is a block diagram illustrating an optical disc drive (ODD) in which a position error compensation method in accordance with embodiments of the invention may be implemented. The ODD includes a digital record signal processor (DSP) 30a for adding an error correction code (ECC), to input digital data, and converting the resultant digital data into record-format data, a channel-bit encoder 40 for reconverting the record-format data into a bit stream, and an optical drive 41 for generating a light-amount drive signal according to an input signal. An optical pickup unit 20 records data on an optical disc 10 based on the light-amount drive signal, and reads data from a recording surface of the optical disc 10, and a Radio Frequency (RF) unit 50 performs a filter-shaping operation on a signal output by the optical pickup unit 20 and generates a corresponding binary signal. A drive unit 61 including a spindle motor 11 rotates the optical disc 10, and a sled motor 21 moves the optical pickup unit 20. A servo unit 60 receives a servo signal and a rotation speed of the optical disc 10 from the RF unit 50, and controls operations of the drive unit 61 using the received servo signal and rotation speed. A digital playback signal processor 30b restores the binary signal to original data using a self-clock signal, a phase of which is synchronized with the binary signal. Position error values for each step associated with one rotation of the step motor after being detected in a manufacturing process of the optical disc drive 10 are stored in a memory 71, and a microprocessor 70 compensates for a position error for each step of the step motor based on the stored position error values. The optical disc drive may also include a spoke detector 12 for detecting a spoke pattern provided in a speed control feature zone of the disc 10 so as to determine if a seated disc has both a data surface and a label surface, such as, for example, the LightScribe disc discussed above, based on a signal output by the spoke detector 12, and controls a rotation speed of the disc.

A disc which includes both a data surface and a label surface, such as, for example, the LightScribe disc discussed above, can record data on a data surface thereof, and can also print a a desired image, or label, on a label surface thereof. The layout of the label surface of such a disc is shown in FIG. 4.

Figure 4:
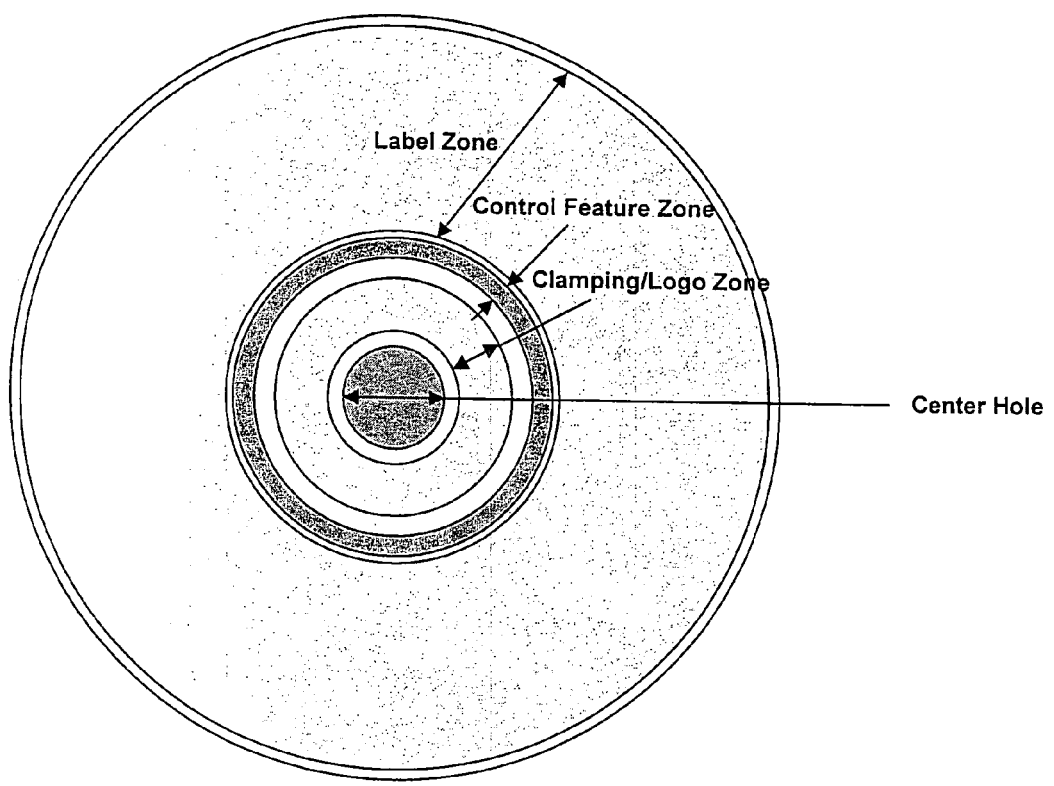
FIG. 4 is a top view of a label surface of an optical disc as shown in FIG. 3.
Figure 5:
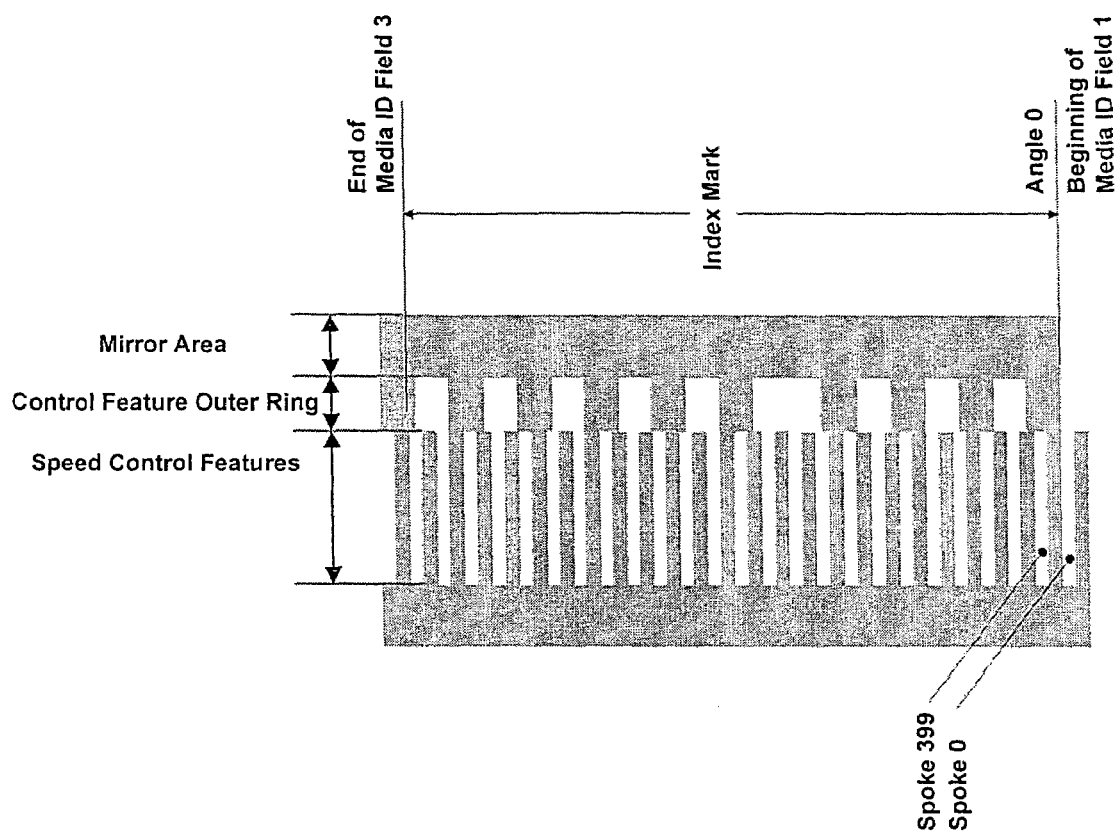
FIG. 5 illustrates a control feature zone and an index mark pattern of an optical disc as shown in FIGS. 3-4.
Figure 6:
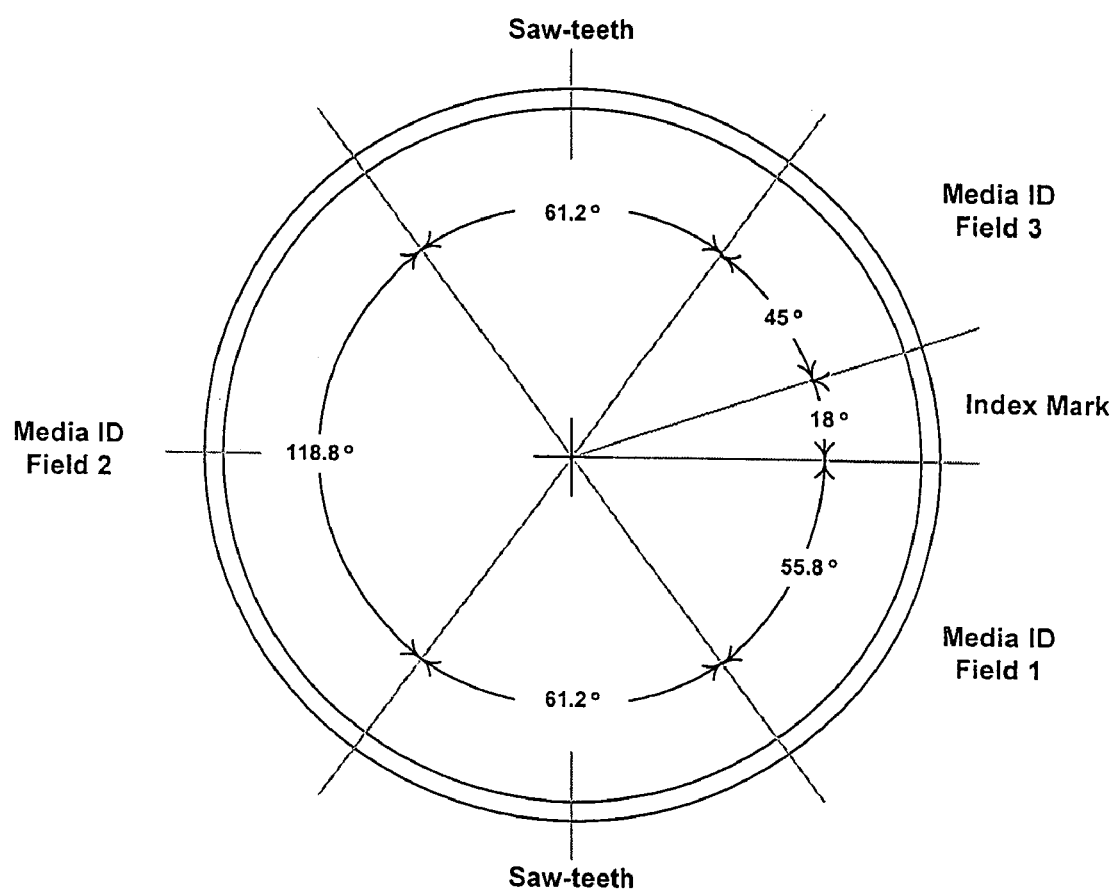
FIG. 6 illustrates a control feature outer ring (CFOR) zone of the control feature zone shown in FIG. 5.

FIG. 5 shows a detailed configuration of the control feature zone of the disc shown in FIG. 4, including an index mark pattern thereof. The control feature zone includes a speed control feature zone, a Control Feature Outer Ring (CFOR) zone, and a mirror zone. The index mark recorded in the CFOR zone allows the CFOR zone to be easily found, and allows for synchronization with the first spoke (Spoke 0) of a spoke pattern portion of the speed control features. More specifically, the first spoke (Spoke 0) delineates an end position of the index mark, and this beginning point is used as a reference position in a circumferential direction of the disc. FIG. 6 shows a detailed configuration of the CFOR zone contained in the control feature zone shown in FIG. 5. The CFOR zone includes the index mark zone, a saw-teeth zone, and first, second, and third media ID Fields (Media ID fields 1, 2, and 3, respectively).

Figure 7:
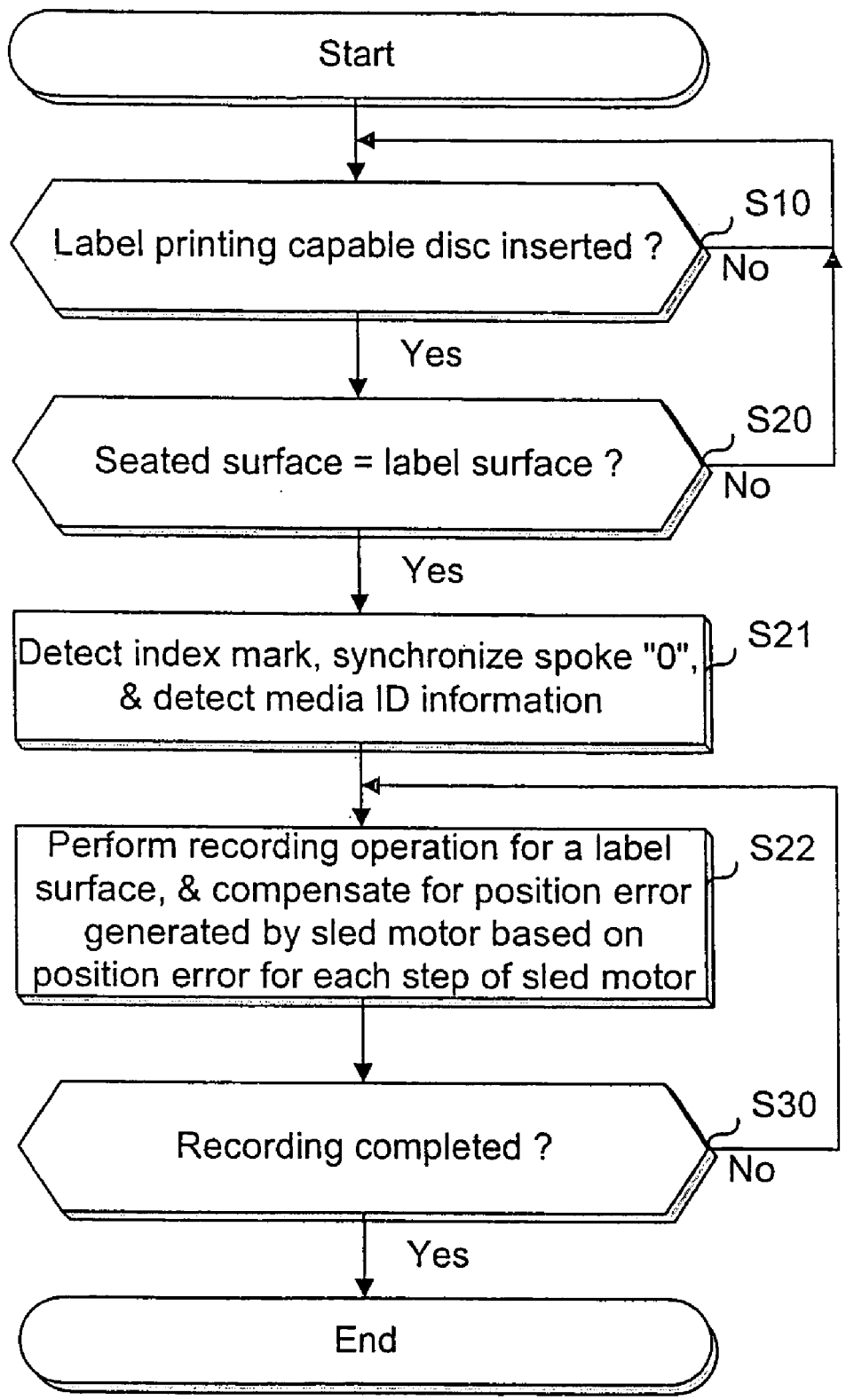
FIG. 7 is a flow chart of a method for compensating for a position error in an optical disc drive, in accordance with an embodiment of the invention.

FIG. 7 is a flow chart of a method for compensating for a position error in an ODD, in accordance an embodiment of the invention. The method for compensating for the position error in the ODD will hereinafter be described with reference to FIGS. 3 and 7.

A disc is seated in the ODD, and the microprocessor 70 determines whether the seated disc has at least a label surface, and preferably, both a data surface and a label surface, such as, for example, the LightScribe disc as discussed above, based on a signal output by the spoke detector 12 at step S10. If the microprocessor 70 determines that the seated disc 10 includes a label surface at step S10, the microprocessor 70 moves the optical pickup unit 20 to a label zone of the disc 10, searches for a peak point of an RF sum value, and determines whether a seated surface of the optical disc 10 facing the optical pickup unit 20 is a label surface at step S20. If the seated surface of the optical disc 10 is determined to be the label surface at step S20, the microprocessor 70 moves the optical pickup unit 20 to the control feature zone of the optical disc 10, detects an index mark from an index mark pattern in the CFOR zone, synchronizes with the first spoke (Spoke 0) based on the detected index mark, and detects media ID information of the CFOR zone from the first spoke (Spoke 0) at step S21.

The microprocessor 70 recognizes a start position of the saw-teeth zone based on detection of the spoke, receives a signal from the saw-teeth zone as the disc 10 rotates, moves an objective lens of the optical pickup unit 20 to a center radial position of the saw-teeth zone based on the detected signal, and measures an actual sensitivity of a track-direction actuator at step S22.

Figure 8:
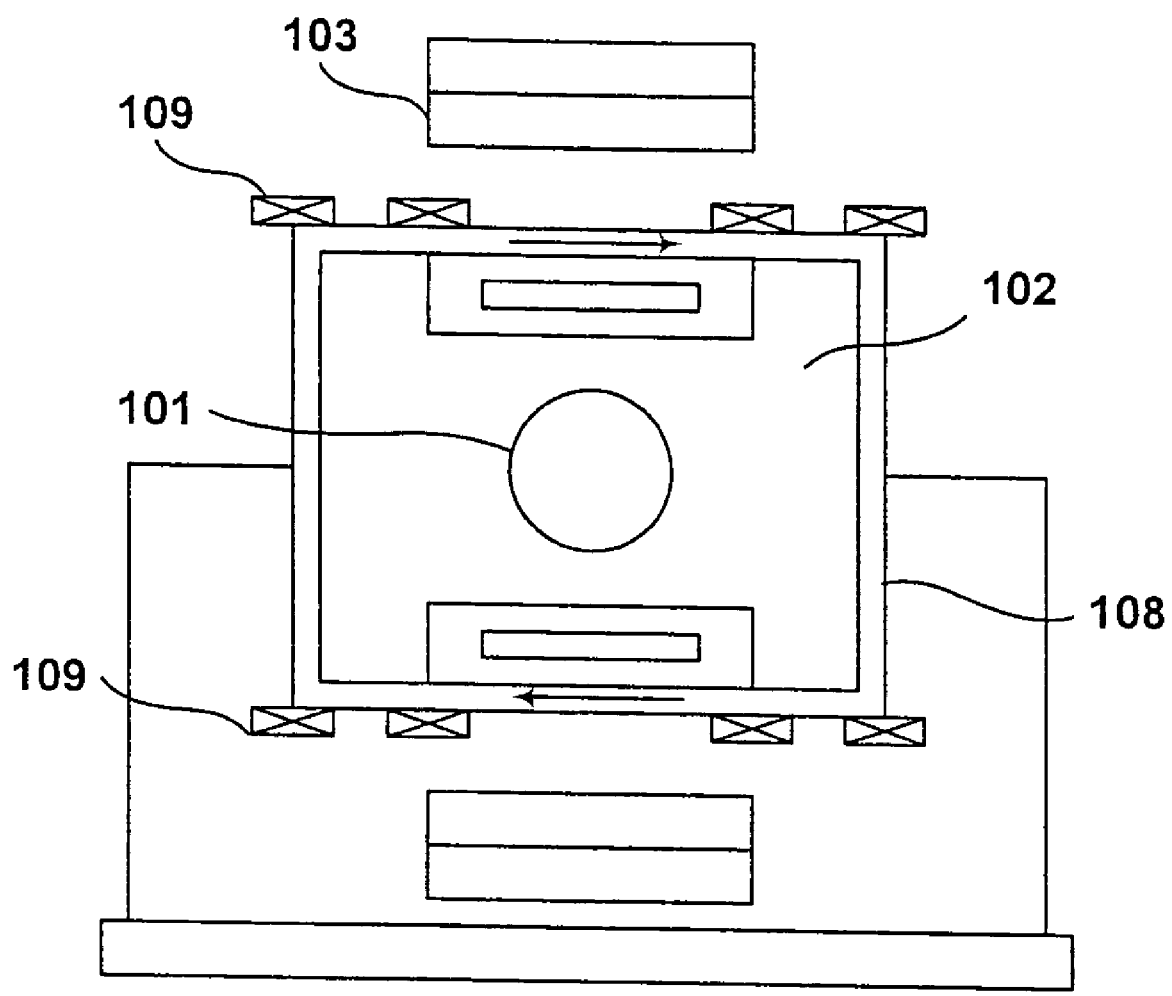
FIG. 8 is a schematic illustration of an exemplary actuator used with an optical pickup unit as shown in FIG. 3.

FIG. 8 illustrates an exemplary actuator 100 for the optical pickup unit 20, in which an objective lens 101 is centrally attached to a lens holder 102, a focusing coil 108 is wound around the lens holder 102, and a tracking coil 109 is attached to an upper surface of the focusing coil 108, with the focusing and tracking coils 108 and 109 facing a set of magnets 103. Electromagnetic forces generated by the magnets 103 in response to driving voltages cause the focusing coil 108 to provide for upward and downward, or vertical, movement of the objective lens 101 within the lens holder 102, and cause the tracking coil 109 to provide for tracking, or horizontal, movement of the objective lens 101 within the lens holder 102.

Thus, more specifically, in step S22, the microprocessor 70 applies a predetermined voltage to the actuator 100 if the objective lens 101 of the optical pickup unit 20 is positioned at the center radial position of the saw-teeth zone, such that it moves the objective lens 101 to the inner or outer area of the disc 10 by a predetermined distance corresponding to the predetermined voltage. This predetermined distance may be, for example, a distance of 30 µm; however, other distances may also be appropriate. Thereafter, the microprocessor 70 calculates an actual movement distance of the objective lens 101 based on a duty ratio of the signal detected from the saw-teeth zone, and from this duty ratio is able to calculate a voltage necessary to move the objective lens 101 to the inner or outer area of the disc 10 by a predetermined distance. By repeating these operations, the microprocessor 70 can correctly compensate for a driving operation of the actuator 100.

The microprocessor 70 moves the optical pickup unit 20 to the label zone of the optical disc 10, and performs a requested operation such as, for example, a label-printing operation, in the label zone. The microprocessor 70 receives a position error for each step of the sled motor 21 from the memory 71, and performs a feed-forward tracking servo operation based on the received position error, compensating for the position error generated by the sled motor 21 at step S22.

This feed-forward tracking servo operation will now be described.

The microprocessor 70 moves the optical pickup unit 20 toward the outer area of the disc at intervals of a predetermined distance using the sled motor 21, such that labels can be sequentially printed in the label zone as the optical pickup unit 20 moves from the inner area toward the outer area of the label zone of the optical disc 10. If instead, the optical pickup unit 20 is fixed, the microprocessor 70 slowly moves the actuator 100 capable of supporting the objective lens 101 toward the outer area. The more biased the objective lens 101 is to the inner or outer area from the center position of the optical pickup unit 20, the lower the optical electrical performance of the optical pickup unit 20 is likely to be. Therefore, if the objective lens 101 is off center with respect to the optical pickup unit 20 and biased toward the outer area of the optical pickup unit 20 by a predetermined distance, the microprocessor 70 operates the sled motor 21 such that it moves the optical pickup unit 20 toward the outer area. In this case, an objective lens 101 positioned at an outer area of the optical pickup unit 20 must be shifted to a center position or inner area of the optical pickup unit 20 during the movement of the optical pickup unit 20.

For example, if optical performance is greatly deteriorated because the objective lens 101 is biased toward the inner or outer area of the disc 10 by a first predetermined distance of, for example, 100 µm from the center part of the optical pickup unit 20, the optical pickup unit 20 must be shifted to another place when the objective lens 101 is biased toward the inner or outer area by a second predetermined distance of, for example, 75 µm, which is shorter than the first predetermined distance of 100 µm. In this case, the minimum unit of movement by which the sled motor 21 may move the optical pickup unit 20 may be determined to be 150 µm, or two times the second predetermined distance of 75 µm. In other words, if the objective lens 101 is biased toward the outer area by 75 µm, the sled motor moves 21 the optical pickup unit 20 toward the outer area by 150 µm. Simultaneously, provided that the optical pickup unit 20 moves by the predetermined distance of 150 µm during one rotation of the disc 10, the microprocessor 70 shifts the actuator to the inner area based on a current position of the objective lens of the optical pickup unit 20 by a predetermined distance of "150 µm—track pitch" (i.e., a predetermined distance of "75 µm—track pitch" on the basis of the center position of the optical pickup unit).

In more detail, if the actuator 100 is biased toward the outer area by a predetermined distance, the optical pickup unit 20 must move to the outer area by a predetermined minimum unit, and at the same time the actuator 100 must move toward the inner area. In this case, a speed and a movement distance of the actuator 100 moving to the inner area are determined based on a time consumed for moving the optical pickup unit 20 by the minimum unit, a distance of the minimum unit, a time consumed for one rotation of the optical disc 10 at a current position, and a track pitch.

Figure 9:
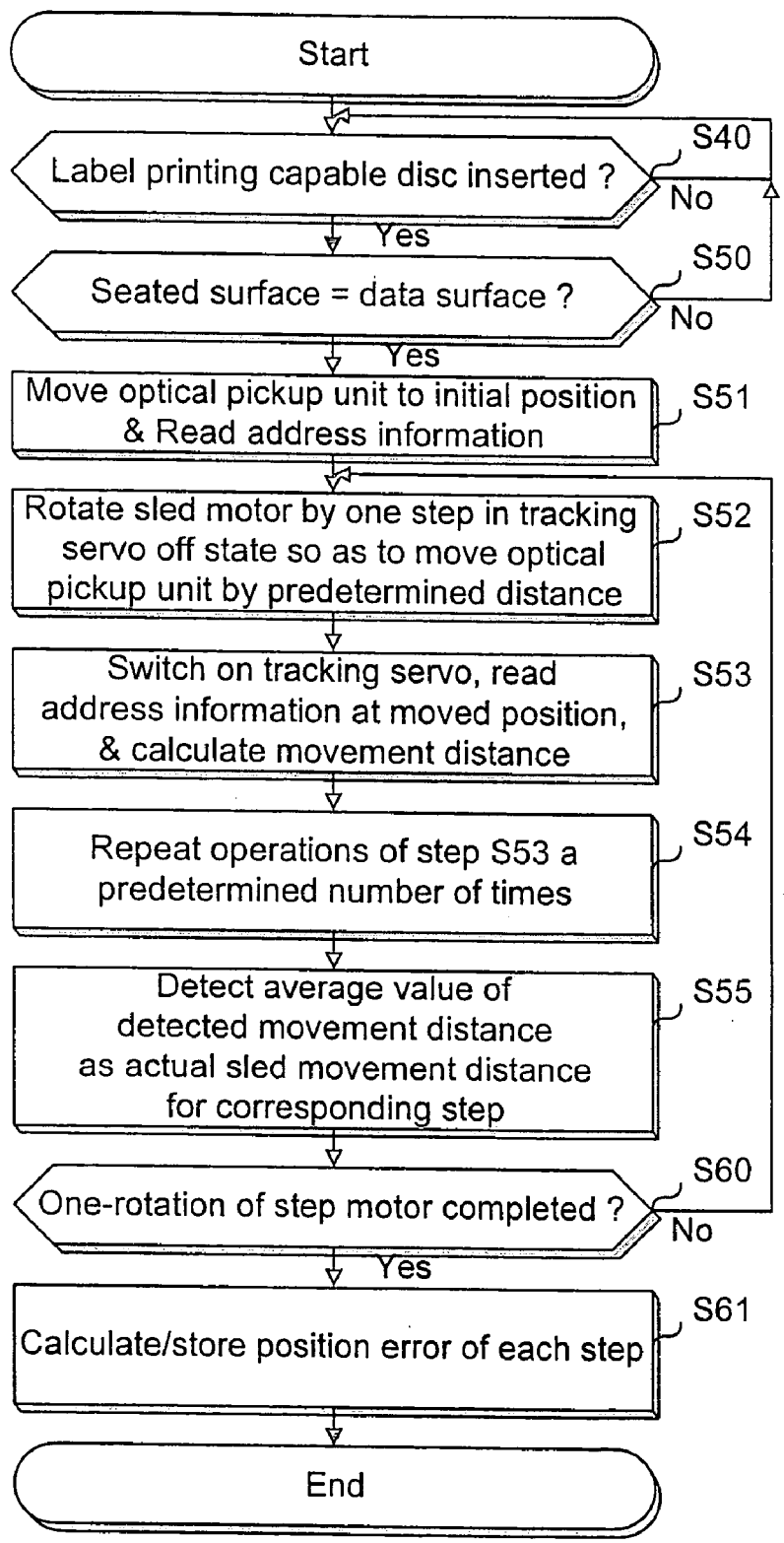
FIG. 9 is a flow chart of a method for detecting a position error in an optical disc drive, in accordance with an embodiment of the invention.
Figure 10:
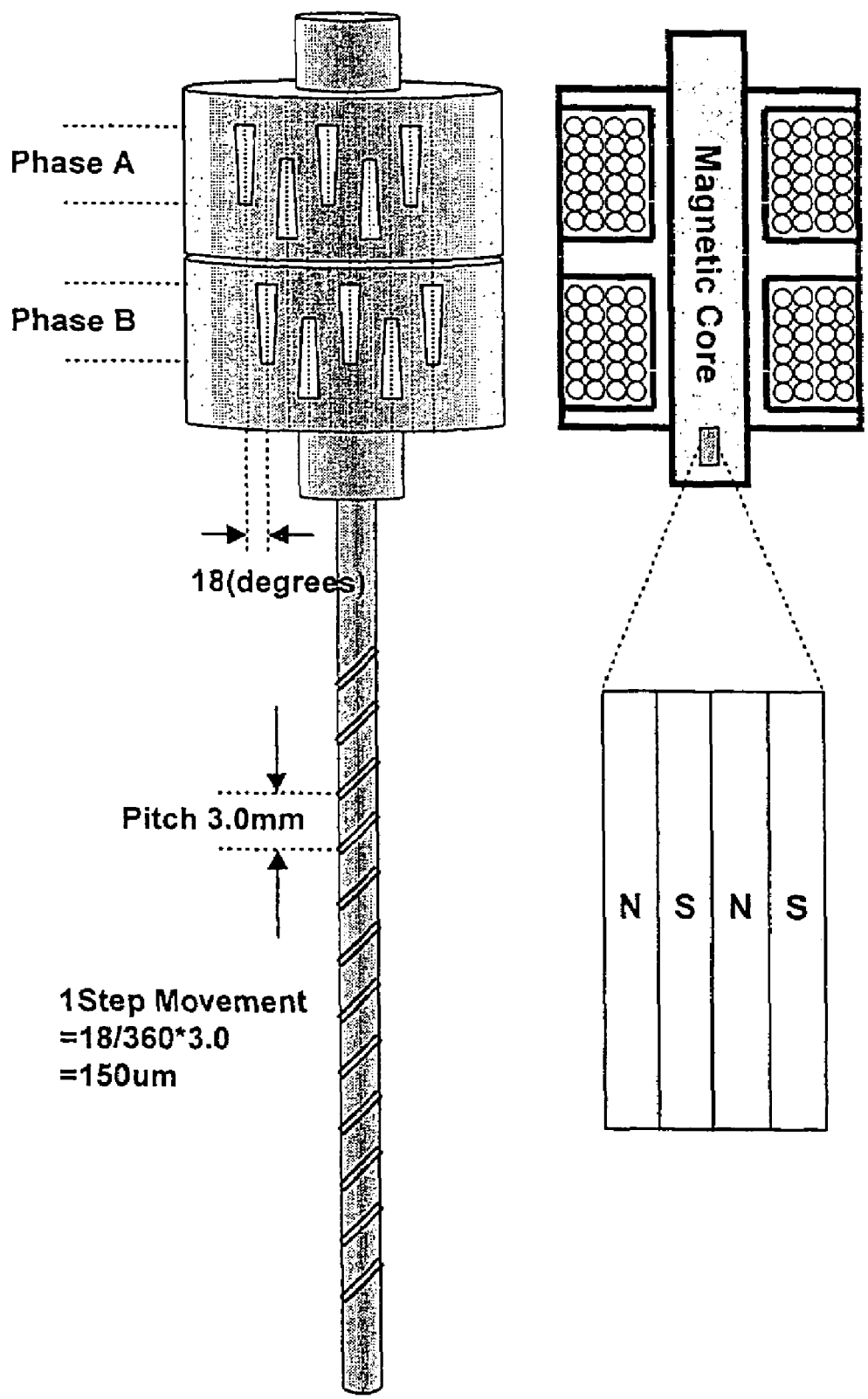
FIG. 10 illustrates an exemplary step motor which may be associated with the methods shown in FIGS. 7-8.

A method for detecting/storing a position error for each step of the step motor will be described with reference to FIG. 9. It is noted that the sled motor 21 includes a step motor which may be in the form of a craw-pole-shaped step motor as shown in FIG. 10. The step motor shown in FIG. 10 uses a two-phase excitation scheme, and rotatably moves by a desired step according to combination of polarities of individual phase voltages. For example, one step may be equal to approximately 1/20 of a rotation, or a rotation of approximately 18°. If a lead screw having a pitch of, for example, 3 mm is provided, then one step corresponds to a rectilinear movement of approximately 150 µm. Therefore, this step motor ideally moves by a predetermined distance of approximately 150 µm, or approximately 90 tracks, for each step (each step=1Kick).

However, as discussed above, the rectilinear movement is affected by a variety of mechanical and electrical factors. Therefore, the microprocessor 70 stores the above-mentioned ideal sled movement distance of 150 µm as a reference sled movement distance. Then, an actual sled movement distance for each step during one rotation of the step motor is detected during manufacturing of the optical disc drive. In this case, if one step of the step motor is 1/20 of a rotation, or a rotation of 18°, the sled movement distance corresponds to a total of 20 steps during one rotation of the step motor. The microprocessor 70 detects actual sled movement distances associated with these 20 steps (i.e., individual steps from a first step (SP1) to a last step (SP20)) and compares them to corresponding ideal sled movement distances, as described below with respect to FIG. 9.

If the microprocessor 70 determines that the optical disc 10 is seated at step S40, the microprocessor 70 determines whether the seated surface of the optical disc 10 is a data surface at step S50. This is done to obtain a block address of the data surface of the optical disc 10 which is required to detect a sled movement distance for each step. If the data surface of the optical disc 10 is seated, the microprocessor 70 shifts the optical pickup unit 20 to a predetermined initial position contained in the optical disc 10 such as, for example, a block address of 0, using the servo unit 60 and the drive 61, and reads address information at the shifted position at step S51. Thereafter, the microprocessor 70 detects an actual movement distance whenever the step motor performs one-step rotation at step S52.

More specifically, the microprocessor 70 applies a predetermined drive voltage to the step motor via the servo unit 60 and the drive unit 61, such that it rotates the step motor by one step (i.e., 1/20 rotation). The optical pickup unit 20 moves a predetermined distance corresponding to this one step based on the initial position at step S52. During the movement of the optical pickup unit 20, the tracking servo remains in an off-state.

If this one-step movement is completed, the microprocessor 70 switches on the tracking servo to read address information at the shifted position contained in the optical disc 10, and detects a sled movement distance associated with the first step SP1 on the basis of two addresses having been read for this one-step movement (i.e., first address information detected prior to the one-step movement and second address information detected after the one-step movement) at step S53. In this case, the detected movement distance is indicative of a number of tracks. When detecting the above-mentioned movement distance in units of a predetermined distance given in µm, instead of track number, the following Equation 1 may be employed:

$$R^2 = R_0^2 + \frac{pv}{\pi} BlockAddress \qquad \text{[Equation 1]}$$

where p=track pitch, v=disc linear velocity, and $R_0$=Block Address where the value is 0.

The microprocessor 70 switches off the tracking servo at the shifted position, then switches on the tracking servo, reads address information, and detects the movement distance. The above-mentioned operations of the microprocessor 70 are repeated a predetermined number of times such as, for example, three times, at step S54 and an average value of the detected sled movement distance is calculated to determine an actual sled movement distance for the step SP1 at step S55. By repeatedly reading the address information at the shifted position, an actual sled movement distance may be determined which takes into consideration any eccentricity components of the optical disc 10.

After detecting the actual sled movement for the step SP1, the microprocessor 70 detects the actual sled movement distance for the next step SP2. For this operation, the microprocessor 70 switches off the tracking servo, and transmits a predetermined drive voltage to the step motor via the servo unit 60 and the drive 61, such that the step motor rotates by one step and, the optical pickup unit 20 moves a predetermined distance corresponding to this one-step. If the one-step movement is completed, the microprocessor 70 reads address information at the shifted position by switching on the tracking servo, and detects a sled movement distance from an initial position prior to initiating this one-step movement to a current position associated with the step SP2. In this case, the microprocessor 70 reads address information at the shifted current position a predetermined number of times and determines an average value of individual detected movement distances to be an actual sled movement distance associated with the step SP2. These operations are repeated, and the microprocessor 70 detects the actual sled movement distance associated with the remaining steps SP3~SP20 at step S60.

If all the actual sled movement distances associated with individual steps SP1~SP20 are detected at step S60, the microprocessor 70 calculates a sled movement error, or a position error, associated with each of the steps SP1-SP20 based on a difference or deviation between the reference sled movement distance of 150 μm (90 tracks) for one step and the detected actual sled movement distance, and stores the calculated sled movement error for each step in the memory 71 at step S61.

Figure 11:
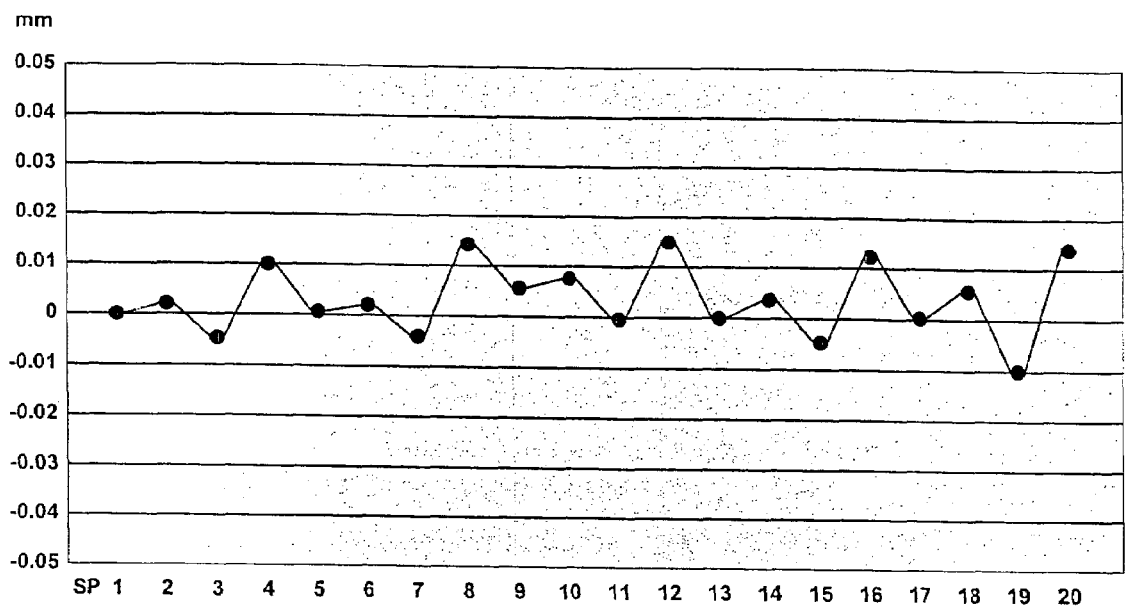
FIG. 11 is a graph illustrating errors associated with individual steps of a step motor such as the exemplary step motor shown in FIG. 1, in accordance with an embodiment of the invention.

FIG. 11 is a graph illustrating sled movement errors associated with the individual steps SP1-SP20 of the step motor collected as described above.

If a recording operation such as, for example, a label-printing operation for the label surface is performed by an ODD in which a position error value for each step of the step motor was detected and stored in the memory 71 during manufacture of the ODD, the microprocessor 70 may compensate for a position error caused by the step motor based on the position error values stored in the memory 71 at step S23.

As shown in FIG. 11, a position error value for a fourth step SP4 of the sled motor (i.e., step motor) is set to 0.01 mm (10 μm). This means that the optical pickup unit 20 is shifted beyond the reference sled movement distance of 150 μm by 10 μm, to 160 μm, during the fourth step SP4. Therefore, when the track-direction actuator moves toward the inner area during the fourth step SP4 of the sled motor, the optical pickup unit 20 is moved toward the outer area by 160 μm, and the microprocessor 70 shifts the track-direction actuator toward the inner area by an additional distance of 10 μm equal to the position error value for the fourth step SP4, such that the microprocessor 70 compensates for the position error caused by the sled motor. The microprocessor 70 can more correctly move the actuator to the inner area using the actual sensitivity of the track-direction actuator calculated at step S22. The compensation operation of the microprocessor 70 described above is repeatedly performed until the recording operation is completed at step S30.

Thus, the microprocessor 70 may store the position error compensation value for each step in the memory 71. For example, if the actual sled movement distance of the step SP1 is 150 μm, the microprocessor 70 determines a position error for the step SP1 to be zero, and thus a position error compensation value for the step SP1 of zero is stored in memory 71. If the actual sled movement distance of the fourth step SP4 is 160 μm, the microprocessor 70 determines a position error for the fourth step SP4 to be 10 μm, and stores the position error compensation value of −10 μm for the step SP4 in the memory 71. If the actual sled movement distance of a step SP19 is 140 μm, the microprocessor 70 determines a position error for the step SP19 to be −10 μm, and stores a position error compensation value of 10 μm for step SP19 in memory 71.

Figure 12:
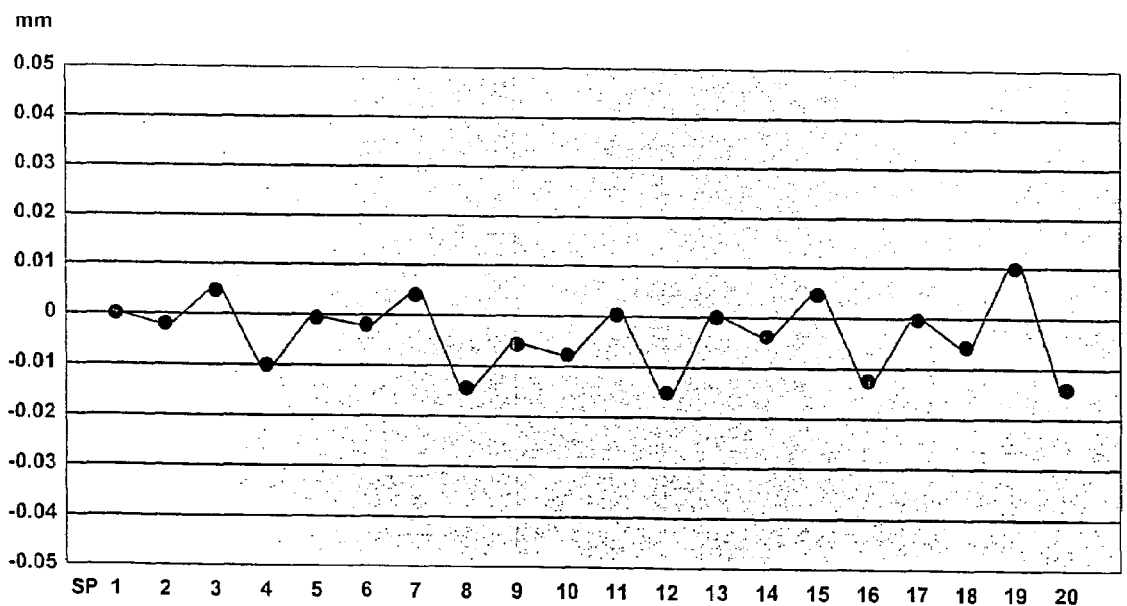
Figure 13:
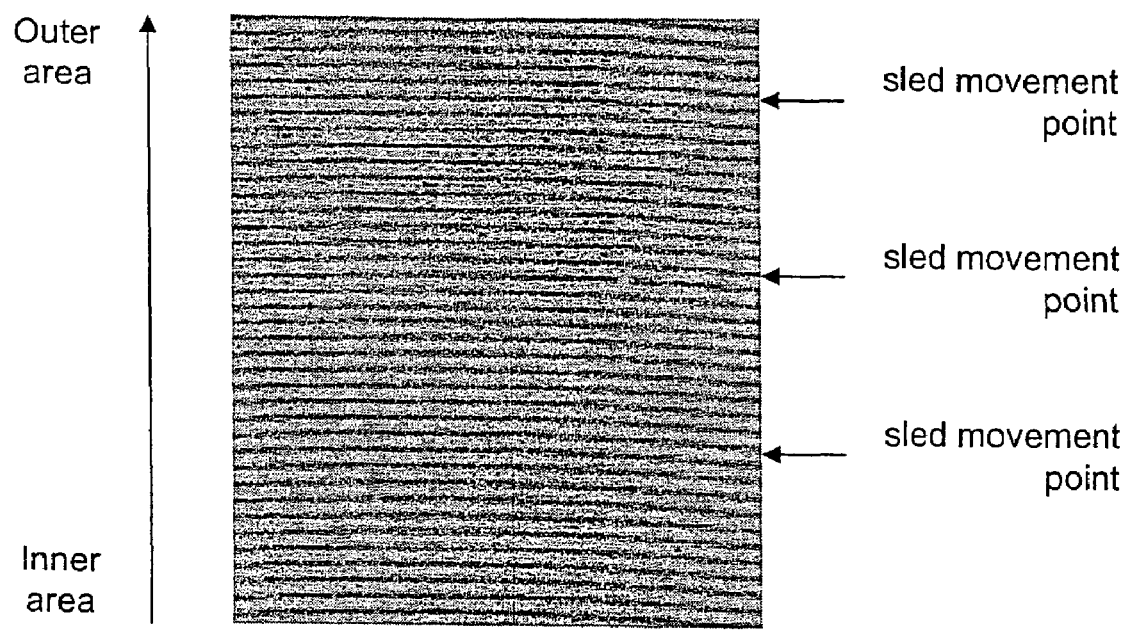
FIG. 13 provides an example of a normal tracking operation generated by position error compensation, in accordance with an embodiment of the invention.

FIG. 12 is a graph illustrating error compensation values of individual steps of the step motor according to the present invention. During the recording operation such as, for example, a label-printing operation on the label surface of the disc, the microprocessor 70 compensates for the position error of the step motor based on the position error compensation values stored in the memory 71. Application of these error compensation values using the method shown in FIG. 7 produces a normal tracking result, as shown in FIG. 13.

As described above, the position error compensation method for use in an optical disc drive apparatus in accordance with embodiments of the invention, properly compensates for a position error associated with each step of the step motor, and acquires a normal tracking result without generating a tracking error, such that a recording operation on the label surface of an optical disc may be stably performed.

Additionally, the position error compensation method for use in an optical disc drive in accordance with embodiments of the invention can stably perform a recording operation on a label surface of a disc without generating a position error, thus improving the quality of the label-printing operation.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of printing a LightScribe disc, comprising:
    determining whether a recordable medium is a LightScribe disc based on a first pattern corresponding to spokes provided near an inner circumference of the recordable medium using a spoke detector;
    determining whether a surface facing an optical pickup device corresponds to a data surface or a label surface based on whether reflection of optical light occurs on the surface or within the LightScribe disc;
    detecting a second pattern corresponding to an index mark;
    synchronizing with a spoke corresponding to position "0", the spokes providing location information of index mark, saw teeth area, media ID area, and controlling a speed of rotation of the LightScribe disc;
    detecting media ID on the LightScribe disc; and
    printing on the label surface of the LightScribe disc, comprising compensating for a position error for each step/sled movement of a prescribed distance of an optical pickup device, wherein a 360 degree rotation corresponds to 20 step/sled movements of the optical pickup device such that each step/sled movement corresponds to an 18 degree rotation of a step motor and the prescribed distance corresponds to 150 μm of the step motor, wherein any position error for each step movement deviating from 150 μm is previously stored in a memory for compensating for any position error during the print step.

2. The method of claim 1, further comprising previously storing position error data and corresponding step movement data during manufacturing of a recording device incorporating the optical pickup.

3. A method of printing a label on recordable medium including a data surface configured to receive and store data on a first side thereof, and a label surface configured to receive a label printed thereon on a second side opposite the first side, the method comprising:
    reading a first pattern from the recordable medium to determine if the recordable medium includes both a data surface on a first side thereof and a label surface on a second side opposite the first side thereof, wherein the first pattern is read by a spoke detector and comprises a plurality of spokes provided proximate an inner circumference of a recordable medium;
    determining if a surface of the recordable medium facing an optical pickup device corresponds to the data surface or the label surface of the recordable medium based on a reflection of optical light from the surface of the recordable medium facing the optical pickup;
    synchronizing operation of the optical pickup device with a reference position delineated by the first pattern if it is determined that the surface of the recordable medium facing the optical pickup device is the label surface;

accessing a plurality of predetermined position error compensation values corresponding to a plurality of predetermined step movements within a rotation of a step motor which moves the optical pickup device; and applying the plurality of predetermined position error compensation values to compensate for a position error as the step motor rotates and moves the optical pickup device while performing a label printing operation to print an image on the label surface of the recordable medium.

4. The method of claim 3, wherein determining if a surface of the recordable medium facing an optical pickup device corresponds to the data surface or the label surface comprises:

determining that the surface facing the optical pickup is the data surface if optical light is reflected from the surface facing the optical pickup; and determining that the surface facing the optical pickup is a label surface if light is not reflected from the surface facing the optical pickup.

5. The method of claim 3, wherein synchronizing operation of the optical pickup device with a reference position delineated by the first pattern compromises synchronizing operation of the optical pickup device with a spoke of the plurality of spokes which corresponds to a zero position on the inner circumference of the recordable medium.

6. The method of claim 3, wherein synchronizing operation of the optical pickup device with a reference position delineated by the first pattern comprises controlling a speed of rotation of the recordable medium.

7. The method of claim 3, wherein the reference position delineated by the first pattern also provides location information related to at least one of a plurality of index marks, a saw teeth area, and a media identification area.

8. The method of claim 3, wherein the predetermined steps within a rotation of the step motor comprise 20 step movements of the optical pickup device within a 360 degree rotation of the step motor such that each step movement corresponds to an 18 degree rotation of the step motor.

9. The method of claim 8, wherein each of the plurality of predetermined step movements has a prescribed distance of approximately 150 μm.

10. The method of claim 9, wherein the prescribed distance of approximately 150 μm is based on a 3 μm pitch of a threaded portion of the step motor.

11. The method of claim 3, further comprising compensating for a driving operation of an actuator which moves a lens of the optical pickup device.

12. The method of claim 11, wherein compensating for a driving operation of the actuator comprises measuring a sensitivity of the actuator, comprising:

positioning the lens of the optical pickup device at a center radial position of a saw teeth area of the first pattern and applying a predetermined voltage to the actuator to move the lens a predetermined distance;

calculating an actual movement distance of the lens based on a duty ratio of a signal detected from the saw teeth area; and calculating an actual voltage required to move the lens the predetermined distance.

13. The method of claim 3, wherein applying the plurality of predetermined position error compensation values to compensate for a position error comprises adjusting each step movement of the step motor by a value substantially equal to its corresponding position error compensation value.

14. The method of claim 3, wherein accessing a plurality of predetermined position error compensation values further comprises previously storing a plurality of position error compensation values in a memory portion of an optical disc device during manufacture of the optical disc device.

15. The method of claim 14, wherein previously storing a plurality of position error compensation values in a memory portion of an optical disc device during manufacture of the optical disc device comprises:

positioning a data surface of the recording medium facing an optical pickup device;

shifting the optical pickup device to an initial predetermined position and reading initial address information from the data surface corresponding to the initial position;

moving the optical pickup device a predetermined distance from the initial position to a new position based on a predetermined drive voltage;

reading address information from the data surface corresponding to the new position and determining an actual distance moved based on the address information; and comparing the predetermined distance moved to the actual distance moved, and determining a corresponding position error value.

16. The method of claim 15, wherein reading address information from the data surface corresponding to the new position and determining an actual distance moved based on the address information comprises:

reading address information from the data surface corresponding to the new position a plurality of times;

determining an actual distance moved each time the address information is read; and averaging the determined actual distances moved to determine an average actual distance moved.

17. The method of claim 15, further comprising repeating moving, reading, and comparing steps a predetermined number of times, tabulating the resulting position error values, and storing the resulting position error values as a plurality of position error compensation values in a memory portion of the optical disc device.

18. The method of claim 3, wherein the recordable medium is a LightScribe disc.

* * * * *